United States Patent [19]

Dyck

[11] 4,363,363
[45] Dec. 14, 1982

[54] TRIP MECHANISM

[76] Inventor: John D. Dyck, 1125 N. Hill Dr., Swift Current, Canada

[21] Appl. No.: 209,215

[22] Filed: Nov. 20, 1980

[51] Int. Cl.³ .............................................. A01B 61/04
[52] U.S. Cl. .................................... 172/264; 172/705
[58] Field of Search ............... 172/261, 264, 265, 267, 172/266, 268, 705, 710, 711

[56] References Cited

U.S. PATENT DOCUMENTS

| 3,219,128 | 11/1965 | Lely | 172/711 |
| 3,402,775 | 9/1968 | Leduc | 172/705 |
| 3,662,839 | 5/1972 | Thorsrud | 172/711 |

FOREIGN PATENT DOCUMENTS

| 528761 | 8/1956 | Canada | 172/266 |
| 758801 | 5/1967 | Canada | 172/710 |
| 136105 | 7/1960 | U.S.S.R. | 172/264 |

Primary Examiner—Richard J. Johnson
Attorney, Agent, or Firm—Wenderoth, Lind & Ponack

[57] ABSTRACT

A trip mechanism for a ground working tool and, particularly, for use on minimum tillage blade cultivators or mold board ploughs. A shank supports the ground working tool and is supported by the implement frame. A parallel-type deflection linkage allows deflection of the ground working tool with the position of the tillage tool remaining parallel to its original working position. A detent linkage keeps the tillage tool in its original position until the predetermined deflection force is reached.

9 Claims, 3 Drawing Figures

4,363,363

TRIP MECHANISM

FIELD OF THE INVENTION

This invention relates to a trip mechanism used for ground working implements and, in particular, to ground working implements such as blade cultivators.

BACKGROUND OF THE INVENTION

In cultivating farmland, obstructions are often encountered in the soil by the ground working tool and, in the absence of some device to reduce the impact of the obstruction with the ground working tool or to allow the ground working tool to give way to the obstruction, the tool can be damaged or destroyed which can be costly and time consuming to replace. In respect to blade cultivators which are used for minimum tillage farming, the replacement cost is particularly high due to the size and quality of the blade.

Previous efforts to solve the problem have not been satisfactory. Perhaps the most rudimentary effort to prevent blade or ground working tool damage is by providing a simple shear bolt to take the force of the impact of the tool with the obstruction. While this prevents destruction of the blade or ground working tool, it does not prevent destruction of the bolt and down time is necessitated by the bolt replacement. A further adverse feature is that if the bolt is sheared, the tillage tool or blade will deflect in a position transverse to the ground called "tip up" thereby "digging a hole" with the tip of the blade. Unless the "hole" is again passed over by the cultivator and filled in, damage or delay to machinery such as swathers or windrowers, which subsequently pass over the hole, can result. Thus, an additional pass needs to be made over the "hole" which requires additional field time.

Another adverse feature following from this "tip up" type of deflection mechanism, particularly with blade type cultivators, is that adequate clearance must be maintained between the blade and the implement frame to allow for the "tip-up". Providing this required clearance is, in many instances, undesirable because of transportation and other space limitations.

A further disadvantage associated with previous type mechanisms is that "detents" are not incorporated into the design. Detents retain a trip mechanism in its working position until a certain force is reached whereas the detent trips and allows deflection of the working tool. Adjustment of the trip mechanism is facilitated by an easily adjustable detent which will not allow the mechanism to trip until the predetermined force is reached.

A requirement of trip mechanisms, particularly when used wth blade type cultivators, is that it needs to be heavy and rugged to withstand the larger forces generated when obstructions are encountered. Previous trip mechanisms tend to be light duty and unsuitable for heavier duty blade cultivator applications.

SUMMARY OF THE INVENTION

According to the invention, there is disclosed a trip mechanism adapted to allow deflection of a ground working tool, said mechanism comprising a shank adapted to be connected to said ground working tool, a support frame adapted to support said shank and ground working tool, a parallel-type deflection linkage comprising upper, lower, forward and rearward arms, a detent linkage connected to said deflection linkage to hold said deflection linkage in an undeflected position and adapted to allow movement of said deflection linkage when a predetermined load on said ground working tool is exceeded, said detent linkage comprising first and second links adapted for relative rotational movement about an axis and a means for adjusting the position of said axis.

DESCRIPTION OF PREFERRED EMBODIMENT

An embodiment of the invention will now be described, by way of example only, with reference to the accompanying drawings in which.

Figure 1:
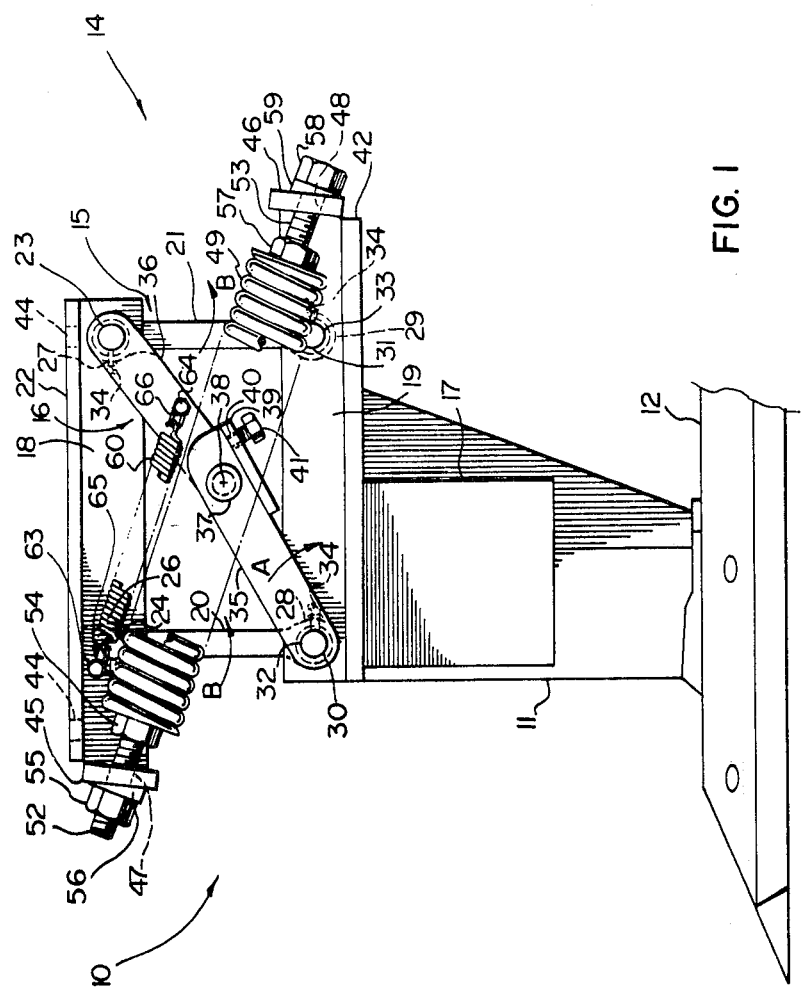
FIG. 1 is a side view of a standard incorporating the invention.
Figure 2:
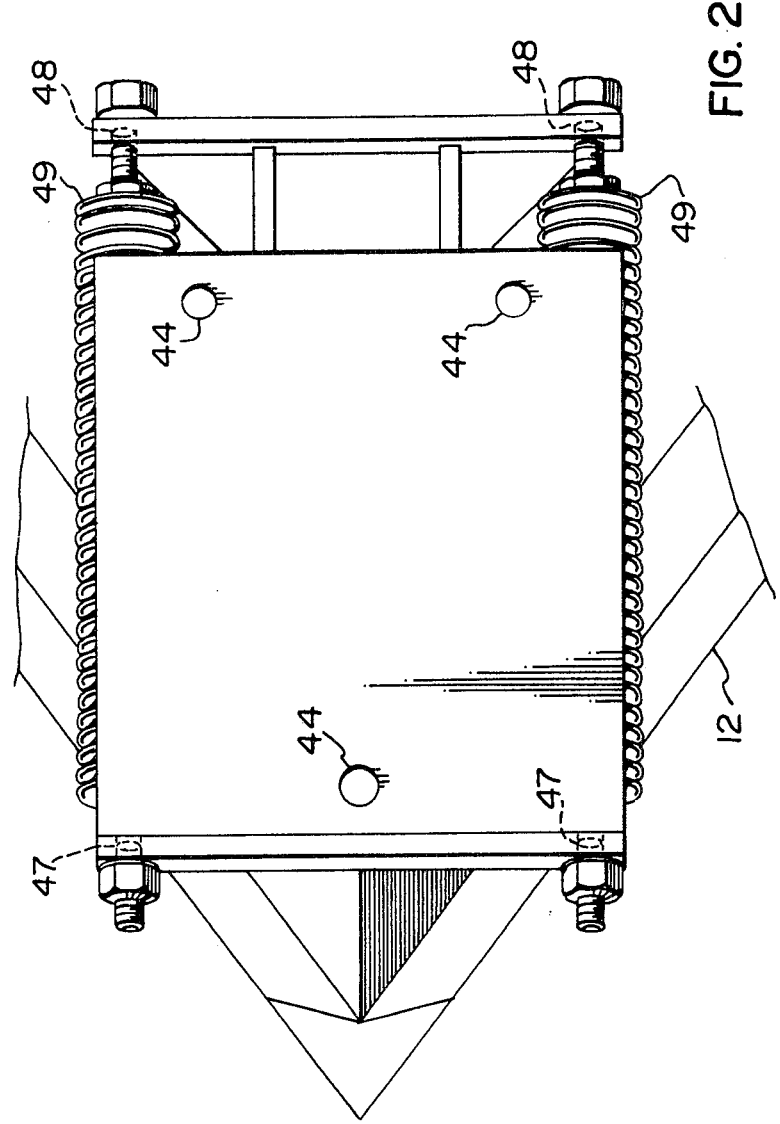
FIG. 2 is a view, in plan, of the standard of FIG. 1.
Figure 3:
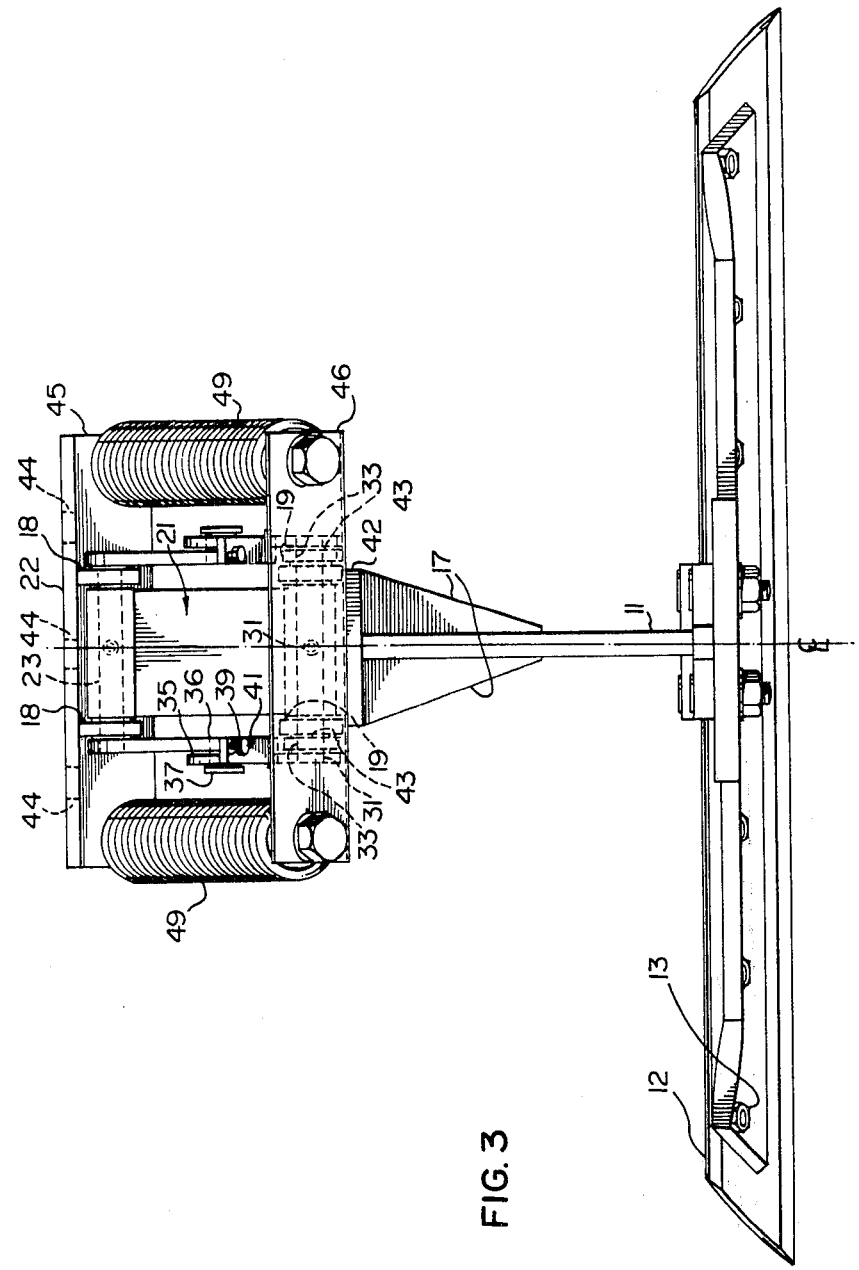
FIG. 3 is a rearward view of the standard of FIG. 1.

A standard is shown generally at 10 in FIG. 1 and comprises a shank 11 adapted to be connected to a ground working tool 12 such as a blade using bolts 13. The shank 11 is connected to a support frame shown generally at 14 which, in turn, comprises deflection linkage 15 and detent linkage 16. A reinforcing assembly 17 extends downwardly on both sides from the support frame 14 as seen in FIG. 3 and provides additional strength for the shank 11. Deflection linkage 15 comprises upper arm 18, lower arm 19, forward arm 20 and rearward arm 21, it being understood that references to position now and hereinafter refer to the direction normally being referred to when the standard is in operating condition, it being so positioned in the drawings. It will also be understood that if reference is made to only the side of the mechanism as seen in FIG. 1, it will also apply to the opposite side since the mechanism is symmetrical about the centre line shown in FIG. 3.

As seen in FIGS. 1 and 3, upper arm 18 extends downwardly from the reinforcing angle 22. Forward and rearward diameters are drilled in upper arm 18 for accommodating forward, upper pin 24 and rearward, upper pin 23 respectively, as will be explained hereinafter.

Forward and rearward arms 20, 21, respectively, extend from the upper arm 22 downwardly to the lower arm 19. Bosses 26, 27, 28, 29 in the forward and rearward arms 20, 21 are machined to allow pins 23, 24, 30, 31 to pass completely through the arms 20, 21. Pins 30, 31 are accommodated similarly to pins 23, 24 in diameters 32, 33 drilled in lower arm 19. Grease nipples 34 are positioned in bosses 26, 27, 28, 29 of forward and rearward arms 20, 21 to allow lubrication of the pins 23, 24, 30, 31.

The detent linkage 16 comprises first and second links 35, 36 respectively, which are journaled with a pin 37 to allow relative rotation about axis 38. Extending inwardly (i.e., into the plane of the drawing as seen in FIG. 1) from and connected to the first link 35, is an "L" portion 39. A threaded diameter 40 is drilled in the L-portion and set-screw 41 is inserted to act on second link 36.

Lower arm 19, similar to upper arm 18 extends upwardly from lower support 42. The shank 11 and reinforcing assembly 17 are connected to support 42 by welding. Similarly, reinforcing assembly 17 is connected to shank 11 and lower support 42 by welding.

A spacer 43 is positioned over pin 30 and between lower arm 19 and first link 35 to allow for the positive positioning of first link 35.

The deflection linkage pins 23, 24, 30, 31 as well as detent linkage 16 are retained in position and prevented from sliding by cotter pins (not shown) inserted through appropriate diameters drilled in the pins 23, 24, 30, 31.

To allow for attachment of the standard 10 to the frame of an operating farm implement, appropriate diameters 44 are drilled in reinforcing angle 22 which will accommodate the necessary attachment bolts (not shown).

A pair of retaining brackets 45, 46 are mounted on upper arm 18 and lower arm 19, respectively, as seen in FIGS. 1 and 3. The retaining brackets 45, 46 extend substantially perpendicular to the upper and lower arms 18, 19 and diameters 47, 48 are machined in retaining brackets 45, 46, respectively, for purposes hereinafter described.

Springs 49 are located between forward retaining bracket 45 and rearward retaining bracket 46. They are tension springs adapted to urge the forward and rearward retaining brackets 45, 46 together. Plugs (not shown) screw into both ends of the springs 49. The plug at the forward end of spring 49 adjacent the forward retaining bracket 45 has an unthreaded diameter in it and a bolt 52 is secured between the plug and the forward retaining bracket 45. A threaded diameter is machined into the plug at the rearward end of spring 49 adjacent the rearward retaining bracket 46 and a second bolt 53 is screwed into this plug. Bolt 52 has a nut 54 adjacent the plug and a second nut 55 between the forward retaining bracket 45 and washer 56. Bolt 53 has nut 57 adjacent the plug and the head 58 of bolt 53 is spaced from rearward retaining bracket 46 by washer 59. Adjustment of the length of spring 49 and, hence, the tension tending to draw the rearward and forward retaining brackets 46, 45, together may be changed by adjusting the distance between the end of the spring and the forward and rearward retaining brackets 45, 46 by rotating head 58 and nut 55.

A second set of springs 60 are located between the upper arm 18 and the detent linkage 16. Diameters (not shown) are drilled in upper arm 18 and the second link 36 of the detent linkage 16 and bolts 63, 64, respectively, are inserted through the diameters. Links 65, 66 are positioned beneath the heads of bolts 63, 64 and the free ends of spring 60 are passed through the links 65, 66 thereby creating a tension in spring 60 which tends to keep the detent linkage 16 in its untripped position where the end of set-screw 41 contacts second link 36.

OPERATION OF THE INVENTION

In operation, the standard 10 is attached to the implement frame (not shown) by bolts (not shown) which are connected between the implement frame and reinforcing angle 22 through diameters 44. The implement itself is attached to a source of pulling power and the blade or ground working tool 12 proceeds while operating beneath the surface of the soil. If an obstruction is encountered which results in a force on the blade 12 of greater than a predetermined amount, the moment created by that force will act on the detent linkage 16 and allow it to trip. The detent linkage 16 will hinge in the direction shown by arrow "A" and the forward and rearward arms 20, 21 will commence rotation about forward and rearward upper pins 24, 23 respectively in the direction shown by the arrows "B". The blade 12 will move rearwardly and upwardly relative to the upper arm 18 while the tension in spring 49 continues to increase. When the obstruction is passed, the spring 49 will pull the forward and rearward retaining brackets 45, 46 together until the detent linkage 16 returns to its non-tripped position.

It may be desired to increase or decrease the force needed to trip the detent linakge 16. In this case, the set-screw 41 is merely adjusted to either increase or decrease the distance of the detent linkage axis 38 from the longitudinal axis extending between the centres of lower forward pin 30 and rearward upper pin 23, an increase in this distance allowing a smaller force to trip the detent linkage 16 and a decrease in the distance requiring a larger force.

The invention is applicable to implements other than blade cultivators. An example of such a suitable implement would be a mold-board plough, but, of course, it could also be used in many other types of ground working implements where deflection of the ground working tool is desirable to prevent tool damage.

The springs used on the implement or ground working tool are, of course, dependent on the soil and operating conditions. Accordingly, all of the springs used on the implement may be replaced by softer or stronger springs depending on the conditions under which they are used.

Accordingly, there has been described a preferred embodiment of the invention. Many changes may be made to this preferred embodiment without departing from the invention which should, therefore, be determined by the proper scope of the accompanying claims.

The embodiments of the invention in which an exclusive property or privileges claimed are defined as follows:

1. A trip mechanism adapted to allow deflection of a ground working tool, said mechanism comprising a shank adapted to be connected to said ground working tool, a support frame adapted to support said shank and ground working tool, a parallel-type deflection linkage comprising upper, lower, forward and rearward arms, a detent linkage connected to said deflection linkage to hold said deflection linkage in an undeflected position and adapted to allow movement of said deflection linkage when a predetermined load on said ground working tool is exceeded, said detent linkage comprising first and second links each adapted for relative rotational movement about an axis said links being pivotally connected together by adjacent ends thereof, and means for adjusting the position of said axis towards and away from a dead center position and only on one side thereof, spring means to return said deflection linkage to said undeflected position after said predetermined load is no longer exceeded, and further spring means to return said detent linkage to its position before movement of said deflection linkage.

2. A trip mechanism as claimed in claim 1 wherein said upper arm of said deflection linkage is parallel to said lower arm, said forward arm of said deflection linkage is parallel to said rearward arm, each respective pair of said opposed parallel arms remaining parallel and said links of said detent linkage rotating about said axis when movement of said deflection linkage occurs, said means for adjusting the position of said axis being mounted on one of said links and acting on the other of said links.

3. A trip mechanism as claimed in claim 3 wherein said lower arm of said deflection linkage is adapted to support said shank, said forward and rearward arms are respectively connected to said upper and lower arms to allow rotational movement relative thereto about respective upper and lower axes, said first link of said detent linkage being mounted for rotational movement about said lower axis of said forward arm, and said second link of said detent linkage being mounted for rotational movement about said upper axis of said rearward arm.

4. A trip mechanism as claimed in claim 2 wherein said means for adjusting the position of said axis is a set-screw.

5. A trip mechanism as claimed in claim 3 wherein said means for adjusting the position of said axis is a set screw.

6. A trip mechanism adapted to allow deflection of a ground working tool, said mechanism comprising a shank adapted to be connected to said ground working tool, a support frame adapted to support said shank and ground working tool, a parallel-type deflection linkage comprising an upper arm, a lower arm parallel to said upper arm and acting to support said shank, a forward arm and a rearward arm parallel to said forward arm, said forward and rearward arms being respectively connected to said upper and lower arms to allow rotational movement relative thereto about respective upper and lower axes, said first and second links being pivotally connected together by adjacent ends thereof, said detent linkage being operatively connected to said deflection linkage to hold said deflection linkage in an undeflected position and to allow movement of said deflection linkage when a predetermined load on said ground working tool is exceeded, said first link of said detent linkage being mounted for rotational movement about said lower axis of said forward arm and said second link of said detent linkage being mounted for rotational movement about said upper axis of said rearward arm, a means for adjusting the position of said centering axis of said detent linkage towards and away from a dead center position and on one side of the centering axis, said means being mounted on one of said links and adapted to act on the other of said links, first spring means adapted to return said deflection linkage to said undeflected position after said predetermined load is no longer exceeded, said spring means being mounted between said upper and lower arms, and second spring means to return said detent linkage to its position before movement of said deflection linkage said second spring means being mounted between said detent linkage and said upper arm.

7. A trip mechanism as claimed in claim 6 wherein said means for adjusting the position of said centering axis is a set-screw.

8. A trip mechanism as claimed in claim 6 wherein said forward and rearward arms have generally rectangular and elongate form, said arms extending substantially transversely to the direction the ground working tool is adapted to move when in operating condition, said axis of said forward and rearward arms being of cylindrical form and extending through the ends of each respective forward and rearward arm, said forward and rearward arms having means to allow lubrication of each of said cylindrical axes.

9. A trip mechanism as claimed in claim 8 wherein said means for adjusting the position of said centering axis is a set-screw and said means to allow lubrication of said cylindrical axes are grease nipples.

* * * * *